UNITED STATES PATENT OFFICE.

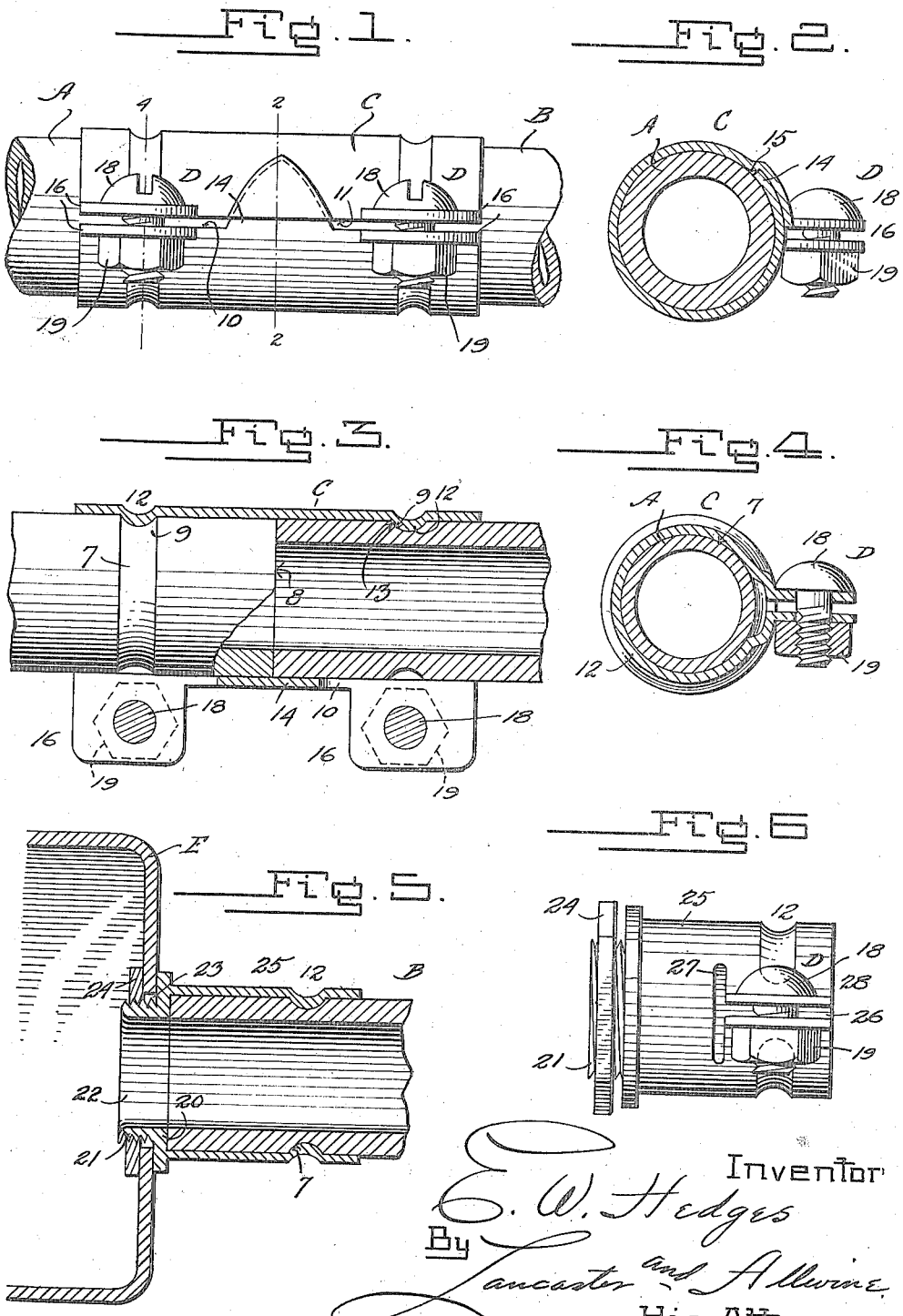

ERNEST W. HEDGES, OF DETROIT, MICHIGAN.

THREADLESS-PIPE SYSTEM FOR CONDUCTORS AND FOR CONVEYING THE VOICE.

1,255,417.　　　　　Specification of Letters Patent.　　Patented Feb. 5, 1918.

Application filed April 26, 1916.　Serial No. 93,743.

*To all whom it may concern:*

Be it known that I, ERNEST W. HEDGES, a citizen of the United States, and a resident of Detroit, in the county of Wayne and State of Michigan, have invented a certain new and useful Improvement in Threadless-Pipe Systems for Conductors and for Conveying the Voice, of which the following is a specification.

My present invention relates to pipe systems for electrical conductors, or for use in conveying the voice, and embodying a plurality of pipe sections joined together with the bores in axial alinement, or a pipe with its bore open to a fixture, such as outlet boxes, or mouthpieces.

The principal objects of my invention are to provide a pipe system well adapted to receive and contain insulated electrical conductors in such a manner that the insulation will not become torn or damaged in the drawing of the conductor through the pipe and past joints, a pipe system well adapted for use in audible signaling, or for conveying the voice, no recesses being left at the joints of pipe sections to retard the transmission of the voice or sound through the pipe system; and, to provide couplings for pipe sections, which are inexpensive to manufacture, and easy to assemble and maintain in good repair.

It is now common practice to provide pipes to contain electrical conductors which are screw-threaded exteriorly at ends, to receive internally screw-threaded couplings or other fittings, such as unions or outlet boxes. It is essential that the joints be water-tight and that there be no sharp bends in the piping since the electric conductors are drawn through joined pipe sections during installation, however, it is difficult to connect the pipe sections, either or both of which have a bend therein, by means of the usual internally screw-threaded coupling, so that the use of unions, which are expensive fittings, is resorted to. Also, with the screw-threaded couplings it is practically impossible to bring the pipe ends into abutting relation, so that an annular recess is left at the adjacent bores, at each joint, presenting sharp edges apt to destroy or damage the insulation when the conductors are drawn into place. Therefore, another object of my invention is to provide a coupling coöperating with specially formed pipe sections and by which the pipe sections may be quickly drawn and held in abutting relation, without rotating either the pipe sections or coupling and providing a waterproof joint.

Furthermore, pipe sections provided with screw-threaded end portions are apt to become damaged in transit, so that re-threading is necessary when the pipe sections are ready for assemblage. It is another object of my invention to provide pipe sections for coöperation with an improved coupling, said pipe sections provided with annular grooves adjacent ends but sufficiently remote therefrom as to not become damaged in transit.

Other objects of my invention will appear in the following detailed description, taken in connection with the accompanying drawing forming a part of this specification, and in which drawing:

Figure 1 is a side elevation of a coupling constructed according to my invention, parts of the pipe sections being shown in operative relation thereto.

Fig. 2 is a sectional view on the line 2—2 of Fig. 1.

Fig. 3 is a view partly in plan and partly in central horizontal section through the parts shown in Fig. 1.

Fig. 4 is a sectional view on the line 4—4 of Fig. 1.

Fig. 5 is a vertical central sectional view through a modified form of coupling well adapted for use in connection with outlet boxes or other fixtures.

Fig. 6 is a side elevation of the modified form of coupling shown in Fig. 5.

In the drawings, where similar characters refer to similar parts throughout the views, A and B designate pipe sections to be disposed in abutting relation; C a coupling; D means for clamping said coupling about the pipe sections or section; and, E a fixture, such as an outlet box.

Referring first to the pipe sections, each is provided with an annular groove 7 adjacent its end 8 but sufficiently remote therefrom so that, in transit, there is little or no danger of the edge of the groove becoming upset or otherwise mutilated. I prefer to form the grooves concave, as clearly shown in the drawing, so that that portion of the groove nearest the end 8, and designated by character 9, recedes toward the other end of the pipe section, and for a purpose to be subsequently set forth.

As to the coupling C, it is preferably made of sheet metal rolled into tubular form so that it is expansible and contractible, and provided with a line of division longitudinally thereof, presenting longitudinal edges 10 and 11. For coöperation with the grooves 7 of the pipe sections, inwardly extending circumferential projections 12 are provided, as by forcing the sheet metal inwardly, these projections being preferably convex at the internal periphery of the coupling so as to present a side 13 of each projection nearest the center of the coupling, which recedes outwardly from its juncture with the main body of the coupling. Thus, when the coupling is placed about pipe sections A and B, axially alined, with the projections 12 adjacent their coöperating grooves 7, the contracting of the coupling will cause the sides 13 of each projection 12 to ride upon the faces 9 of the grooves 7, drawing the pipe sections into abutting relation, and so that a substantially smooth surface is provided at the internal periphery of the pipe system, as clearly shown in Fig. 3 of the drawing.

The coupling may also be provided with a tongue 14 extending from the longitudinal edge 10, preferably midway of the planes of projections 12, this tongue to fit in a depression 15 at the internal periphery of the coupling and open at the longitudinal edge 11 thereof. Tongue 14 is arcuate and the depression 15, which may be formed by pressing the body of the metal outwardly, is circumferentially alined, so that, as the coupling is contracted about the pipe sections, the tongue 14 will fit in depression 15, and cover the abutting edges of the pipe sections.

In order that the coupling may be contracted and held in intimate contact with the pipe sections, it is preferably provided with a pair of perforated extensions 16 for each co-acting projection 12 and groove 7, one extension of each pair at each longitudinal edge of the coupling, and the perforations disposed with their axes in the same central plane as their respective projection and groove. These extensions 16 may be formed in the stamping process, and bent at right angles to the main body portion of the coupling in such a manner that they are positioned for the reception of means D adapted to contract and hold the coupling in intimate contact with the pipe section. This means D may comprise a bolt 18 extending through alined perforations, and receiving a nut 19, as is clearly shown in the drawing.

By arranging the pairs of projections 16 with the axes of the perforations thereof in the same central plane as its adjacent projection and groove, the force may be concentrated upon the former so as to effectively draw the pipe sections into abutting relation.

Referring now to the modifications shown in Fig. 5, the coupling is provided with an abutment 20 against which the end of pipe section B engages, and the extension 21 from abutment 20 is provided with a bore 22 in alinement with the bore of pipe section B. This extension 21 is screw-threaded externally, and passes through a perforation 23 in the fixture E, receiving a nut 24, so that coupling C is carried by the fixture. The main body portion 25 of the coupling is tubular in shape, and provided with a longitudinally extending slot 26 and a circumferentially extending slot 27, open one to the other. From the edges of longitudinal slot 26, a pair of extensions 28 are provided, similar to the pair of projections 16 hereinbefore described, and adapted to receive the means D for contracting and holding the coupling in intimate contact with the pipe section. The circumferentially extending slot 27 is provided in order that the free end portion of the coupling may be expanded or contracted.

It is to be observed that, by the application of my invention to pipe systems, it is not necessary to rotate either the pipe sections or the coupling during assemblage, yet the pipe sections are securely held in abutting relation, presenting no recesses at the internal periphery of the system, and the joints are water-tight resulting from the concealment of the abutting edges within the main body portion of the coupling. The structure is also durable inasmuch as the clamping action of the means 17 is concentrated upon the coacting grooves and projections.

Changes in details may be made without departing from the spirit or scope of my invention; but,

I claim:

1. In a pipe system, the combination of two pipe sections, an expansible and contractile tubular coupling having a line of division longitudinally thereof, said pipe sections and coupling provided with circumferentially extending coacting projections and grooves which interengage when said pipe sections are in abutting relation, and said coupling provided with a pair of perforated extensions for each coacting projection and groove, one extension of each pair at each longitudinal edge of said coupling, and said perforations disposed with their axes in the same central plane as its respective projection and groove, and fastening devices for said extension passing through the perforations thereof and adapted to contact and hold said coupling into intimate contact with said pipe sections and concentrate the gripping action at the said co-acting projections and grooves.

2. In a pipe system, the combination of a pipe section, an element in communication with the bore of said pipe section, an expansible and contractile tubular coupling joining said pipe section and second mentioned element, said coupling slotted longitudinally and provided with a pair of perforated extensions at the longitudinal margins of said slot, said pipe section and coupling provided with circumferentially extending co-acting projection and groove which interengage, and the said perforations of said extensions having a common axis in the plane of said co-acting projection and groove, and a fastening device extending through said perforations of said coupling adapted to draw the same toward each other and bind the said coupling in intimate contact with said pipe section and concentrate the gripping action at the said coacting projection and groove.

ERNEST W. HEDGES.